(12) United States Patent
DeVico et al.

(10) Patent No.: US 12,124,603 B2
(45) Date of Patent: Oct. 22, 2024

(54) GENERATING ENTITY RISK SCORES AND MITIGATING RISK BASED ON THE RISK SCORES

(71) Applicant: Progrexion IP, Inc., Salt Lake City, UT (US)

(72) Inventors: Michael Angelo DeVico, Park City, UT (US); Matthew Joseph DeVico, Salt Lake City, UT (US); Justin Randall Padawer, Salt Lake City, UT (US); Taylor Cushman Rose, South Jordan, UT (US); Richard Edward Horne, Farmington, UT (US); Ian James Bell, Saratoga Springs, UT (US)

( * ) Notice: Subject to any disclaimer, the term of this patent is extended or adjusted under 35 U.S.C. 154(b) by 156 days.

(21) Appl. No.: 17/380,586

(22) Filed: Jul. 20, 2021

(65) Prior Publication Data
US 2023/0021423 A1 Jan. 26, 2023

(51) Int. Cl.
| | |
|---|---|
| *G06F 21/62* | (2013.01) |
| *G06F 16/9536* | (2019.01) |
| *G06F 21/57* | (2013.01) |
| *H04L 67/50* | (2022.01) |

(52) U.S. Cl.
CPC ...... *G06F 21/6245* (2013.01); *G06F 16/9536* (2019.01); *G06F 21/577* (2013.01); *H04L 67/535* (2022.05); *G06F 2221/034* (2013.01)

(58) Field of Classification Search
CPC ........ G06F 21/50; G06F 21/57; G06F 21/577; G06F 21/62; G06F 21/6218; G06F 21/6245; G06F 16/95; G06F 16/951; G06F 16/9535; G06F 16/9536; G06F 16/9538; G06F 2221/03; G06F 2221/034
See application file for complete search history.

(56) References Cited

U.S. PATENT DOCUMENTS

| | | | |
|---|---|---|---|
| 2016/0148332 A1* | 5/2016 | Stibel | H04L 67/53 705/44 |
| 2016/0381034 A1* | 12/2016 | Chan | H04L 51/212 726/26 |
| 2018/0288070 A1* | 10/2018 | Price | G06F 8/31 |
| 2019/0222602 A1* | 7/2019 | Linder | G06F 16/24578 |
| 2019/0349351 A1* | 11/2019 | Verma | H04L 63/30 |
| 2020/0302087 A1* | 9/2020 | Parkinson | H04W 12/02 |

* cited by examiner

*Primary Examiner* — D'Arcy Winston Straub
(74) *Attorney, Agent, or Firm* — Workman Nydegger

(57) ABSTRACT

Techniques for assessing a computing risk of an entity based on a social media footprint of that user. Social media accounts of an entity are identified. Queries are executed against the accounts to determine a social media footprint the entity has based on engagements with those accounts. The footprint reflects at least how much information associated with the entity has been exposed as a result of the engagements with those accounts. Based on the footprint, a risk score for the entity is developed. The risk score reflects a determined amount of computing risk the entity has with regard to potential malicious use of exposed entity information. Based on the risk score, mitigation operations are performed in an attempt to reduce the risk score.

20 Claims, 11 Drawing Sheets

GENERATING ENTITY RISK SCORES AND MITIGATING RISK BASED ON THE RISK SCORES

BACKGROUND

"Identity Theft" refers to an occurrence when a person or entity improperly uses another person or entity's identifying information. Examples of such identifying information include, but certainly are not limited to, a person's social security number, driver's license number, credit card information, birth date, bank information, name, electronic signature, passwords, and so on. Generally, identity theft occurs in an attempt to gain financial benefits at the expense of the victim.

Identity theft, such as identity theft 100 of FIG. 1, can occur in numerous different ways. Often, identity theft occurs as a result of a person's interaction with a computer system. In the scenario shown in FIG. 1, the user has navigated to a malicious website and has unwittingly entered his/her personal and private information. Malicious entities can monitor that website and then use the entered information to perform identity theft.

Identity theft happens all around us and happens every day. What is needed, therefore, is an improved technique for assessing when identity theft occurs, for assessing what behaviors lead to identity theft, and for performing mitigating operations in an attempt to reduce the likelihood of identity theft occurring.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., hardware storage devices, wearable devices, etc.), and methods for assessing a computing risk of an entity based at least on a social media footprint of that entity.

In some embodiments, social media accounts of an entity are identified. The embodiments execute queries associated with the social media accounts to determine a social media footprint the entity has based on engagements with those social media accounts. The social media footprint reflects at least how much information associated with the entity has been exposed as a result of the engagements with the social media accounts. Based on the social media footprint, a risk score for the entity is developed. The risk score reflects a determined amount of computing risk the entity has with regard to potential malicious use of exposed information. Based on the risk score, mitigation operations are performed in an attempt to reduce the risk score and ultimately to reduce the entity's risk of identity theft.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
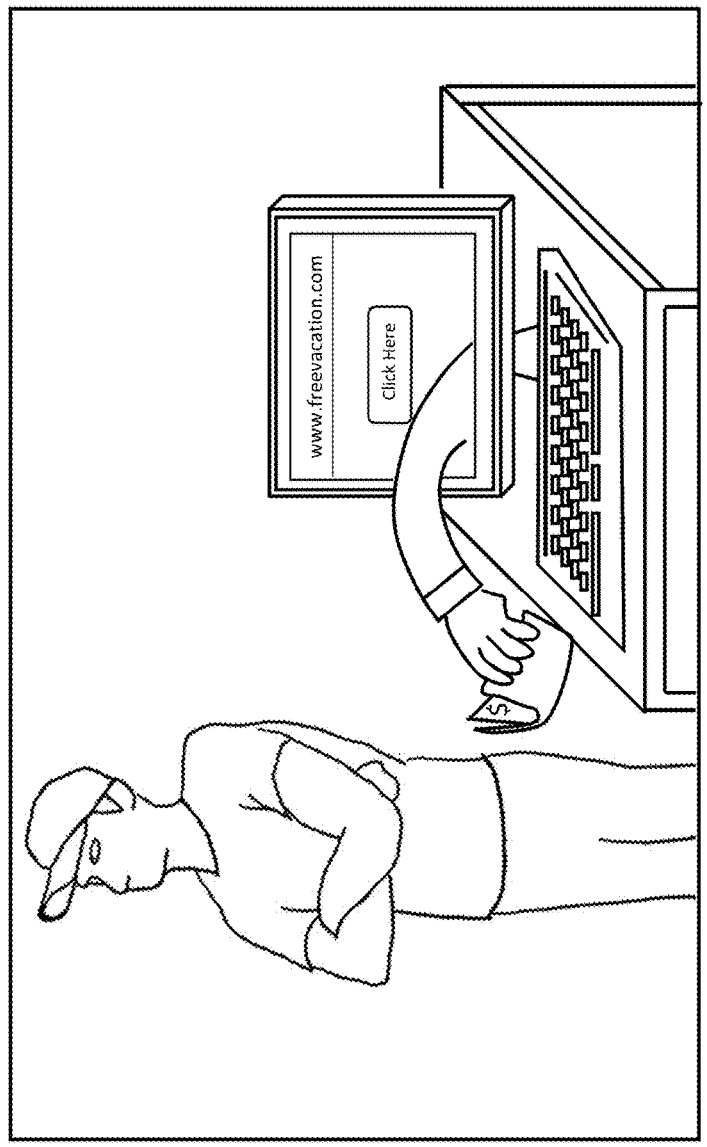
FIG. 1 illustrates how identity theft can occur from interactions with a computing system.

Embodiments disclosed herein relate to systems, devices (e.g., hardware storage devices, wearable devices, etc.), and methods for assessing a computing risk of an entity based at least on a social media footprint of that entity. As used herein, the term "entity" should be interpreted broadly to include, but not be limited to, individual users, groups of users, businesses or organizations, or even large-scale enterprises.

In some embodiments, social media accounts of an entity are identified. Queries are executed against the social media accounts to determine a social media footprint the entity has based on engagements with those social media accounts. The social media footprint reflects at least how much information associated with the entity has been exposed as a result of the engagements with the social media accounts. Based on the social media footprint, a risk score for the entity is developed. The risk score reflects a determined amount of computing risk the entity has with regard to potential malicious use of exposed information. Based on the risk score, mitigation operations are performed in an attempt to reduce the risk score and to reduce the likelihood of identity theft.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits to the technical field and to users/entities. By way of example, the embodiments help detect the likelihood that an entity's identity may have been stolen. These detection operations are paired with various mitigation operations that can also be performed, thereby leading to a real and practical application in which the disclosed principles are performed. By performing mitigation operations, the embodiments beneficially help reduce the risk of having an identity stolen and/or reduce the impact of having an identity stolen.

The embodiments employ smart algorithms designed to identify risks that lead toward an increased likelihood of identity theft. It is often the case that "an ounce of prevention is worth a pound of cure." By preemptively monitoring and determining risk before identity theft occurs, the embodiments help reduce the amount of computing that might later be required if identity theft were to actually occur. In this sense, the embodiments provide for a more efficient use of computing resources. Intelligent algorithms can also be employed to better identify and discern when risk is present. Consequently, improvements are achieved via the use of tailored machine learning algorithms and other detection techniques. Accordingly, these and numerous other benefits will be discussed throughout the remaining portions of this disclosure.

Risks Involved with Interacting with Computing Systems

Figure 2:
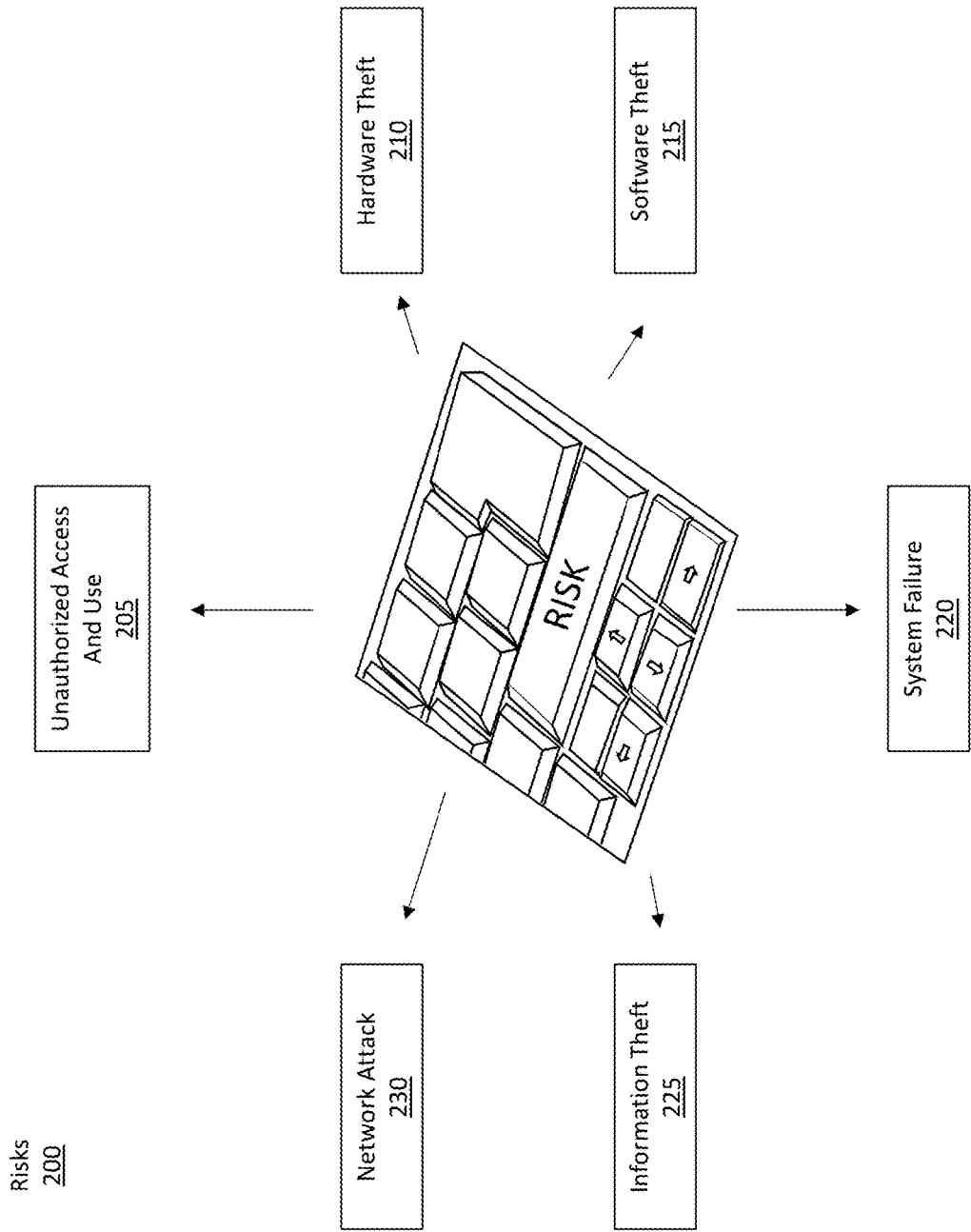
FIG. 2 illustrates how different risks are prevalent when using computing systems.

Attention will now be directed to FIG. 2, which lists a set of risks 200 that may occur as a result of interacting with a computer system. Initially, risks 200 is shown as including an unauthorized access and use 205 risk. This particular risk occurs when an unauthorized entity gains access to another entity's computing system(s) or account(s). This type of risk can occur when an entity obtains login credentials or access to another's account or system.

Another risk involves hardware theft 210, where an entity's computing hardware (e.g., laptop, phone, desktop, etc.) is physically stolen. Another risk involves software theft 215 where an entity's software is stolen. For instance, software theft can occur as a result of pirating or of improper peer-to-peer sharing of a piece of software.

The system failure 220 risk occurs when a computing system stores personal data, and that system fails without having a backup in place. The data that was stored on the system may become unrecoverable, thereby resulting in potentially substantial data loss.

Another risk includes information theft 225 where an entity's personal information (e.g., credit card information, banking information, personal details, etc.) is stolen. This type of theft has occurred for ages in a physical manner (e.g., theft of a wallet) but it can also now occur over networked devices.

Another type of risk is a network attack 230, where an entity's network or computer system is attacked from an outside source (e.g., virus, malware, phishing, etc.) or even from an internal attack. All of these risks (and many others) occur as a result of interacting with a computer system. Many methodologies are in place in order to try to reduce these risks, such as anti-virus technologies, malware technologies, and so forth. Such techniques are beneficial for reducing risk to the computer system, but such techniques are deficient in terms of preventing and/or detecting identity theft relative to the user of the computer system. What is needed, therefore, is an improved technique not only for protecting a computing device from risk but also programmatically protecting a user/entity from risks involved with using computing devices in order to guard against identity theft.

Architecture for Assessing and Mitigating Risk of Identity Theft

Figure 3:
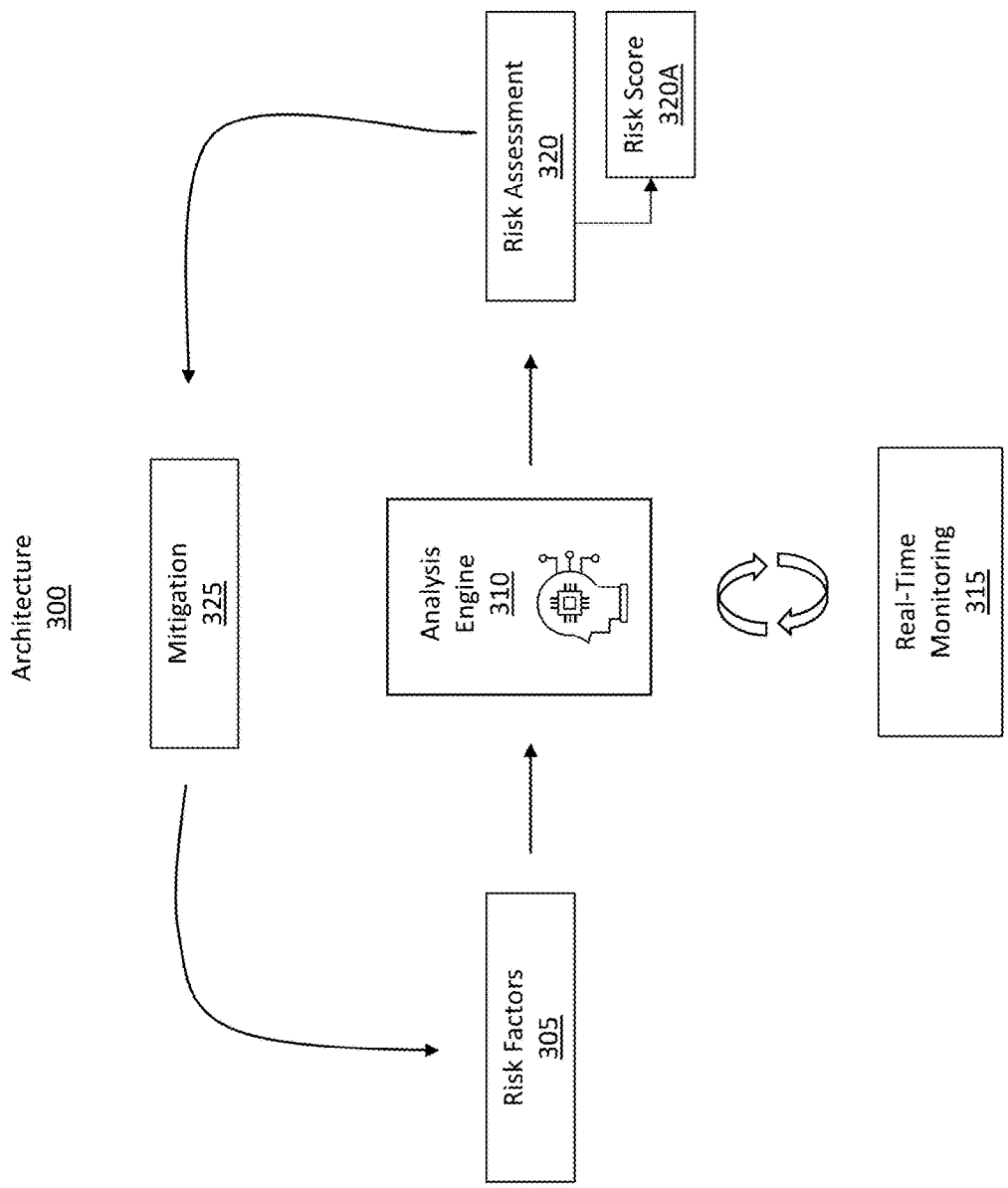
FIG. 3 illustrates an example architecture designed to assess computing risk for any given entity.
Figure 4:
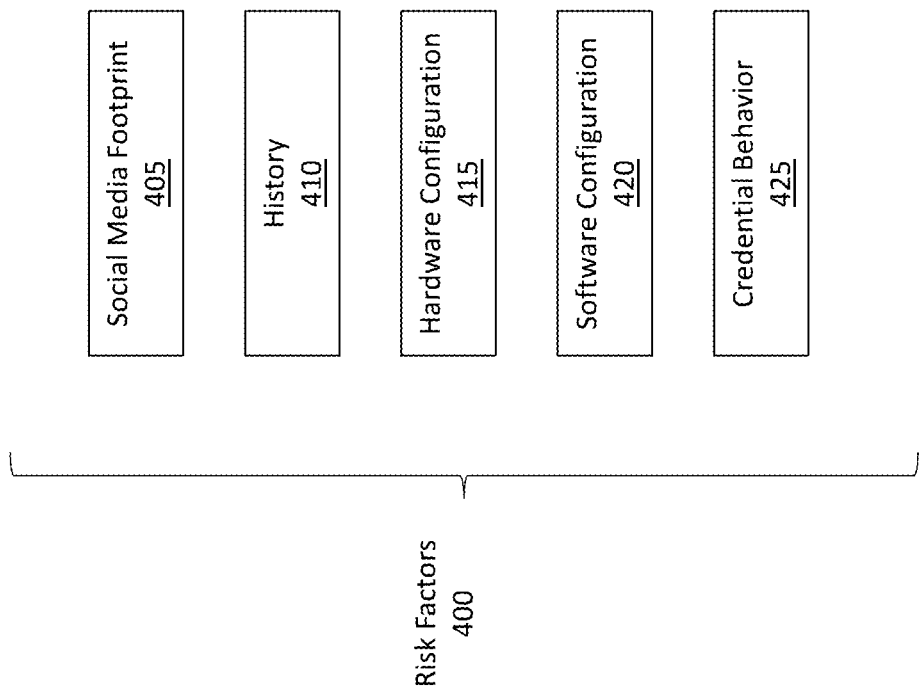
FIG. 4 illustrates various risk factors that can be monitored to determine an entity's risk.
Figure 5:
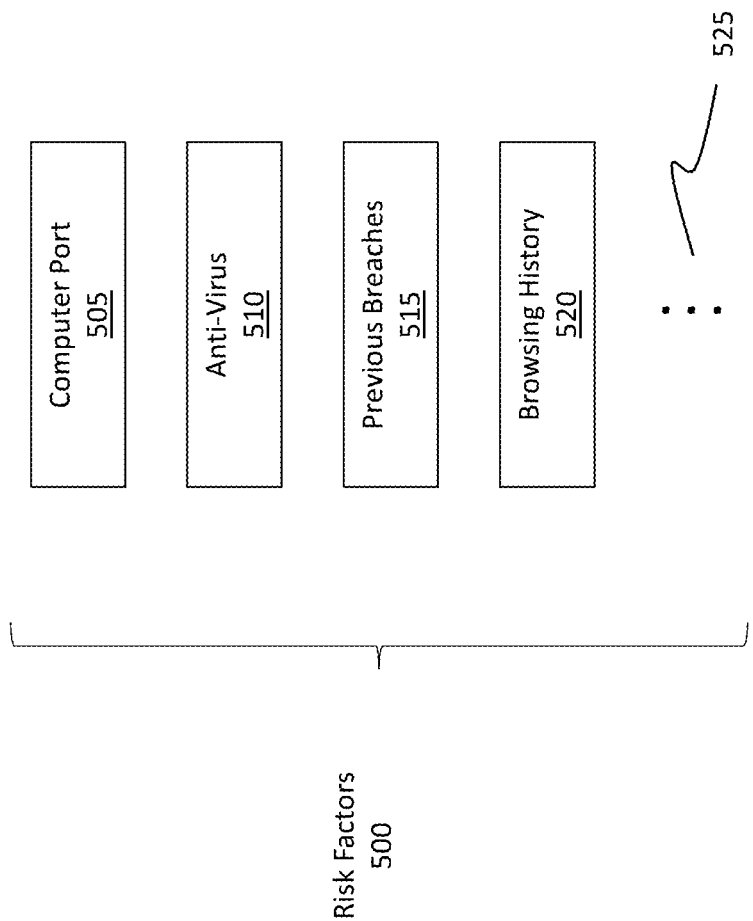
FIG. 5 illustrates some additional risk factors that may be monitored.

FIG. 3 shows an example architecture 300 that is designed to improve how risks related to identity theft are identified and mitigated in order to reduce the likelihood of identity theft. Architecture 300 initially shows how a number of risk factors 305 can be analyzed by an analysis engine 310. FIGS. 4 and 5 illustrate a few example factors that can be included in the risk factors 305.

Turning to FIG. 4, risk factors 400 are representative of the risk factors 305 from FIG. 3. Risk factors 400 include, but are not limited to, a social media footprint 405, a history 410, a hardware configuration 415, a software configuration 420, and a credential behavior 425. Each of these factors will now be discussed in detail.

The social media footprint 405 refers to the amount of information an entity has posted or has made accessible to one or more social media accounts. The term "accessible" refers to the availability or opportunity to access data, whether in a public setting or in a private setting. Such information includes, but is not limited to, any kind of text, photograph, audio, video, or metadata content. As an example, an entity may post an image with corresponding text to a FACEBOOK™ account or to an INSTAGRAM™ account. The photograph might have a geotag associated with it, where the geotag is a form of metadata.

A potentially malicious entity can examine the text, photograph, and metadata and can learn information regarding the entity's habits or other aspects of the entity's life. As an example, suppose the photogram captured a user's children playing in the backyard of the user's house. From that single photograph, the malicious entity can learn where the entity lives or resides (based on the geotag coordinates), how many children the entity has, and potentially even some other habits of the entity. For instance, if the children are school-aged children, then daily habits or routines of the user can potentially be discerned based on the understanding that children often attend school during the day, potentially leaving the user home alone. Additionally, it may be the case that the children are wearing clothing that has identifying information, such as the name of a child's school. Now, the malicious entity may know not only where the user lives but also where the user's children attend school. If the school is located far away from the user's house, the malicious entity can discern that the user may be away from his/her house for a period of time when transporting his/her children to the school, thereby potentially providing an opportunity to identify an unattended home.

The social media footprint 405 also includes a frequency by which the entity posts or publishes content on social media platforms, including which platforms the entity uses most frequently. In this regard, the social media footprint 405 can indicate which platforms are the most frequently used or most popular for a given entity and can also indicate how often the entity engages with the social media platform. The term "engage" and its variants should be interpreted broadly to include any type of activity with a platform. Such activity can include the simple act of logging on and navigating/viewing content, perhaps without selecting options or perhaps with selecting options. The activity can also include actively posting or publishing content or "liking" or "disliking" content. Any activity can be included as an "engagement."

In some instances, the social media footprint 405 includes tracking metrics that indicate frequency of use or engagement and frequency of publication. In some cases, a distinction can be made between how often an entity simply looks at social media content versus how often an entity publishes content on a platform.

The social media footprint 405 can indicate which times of day the entity is active on social media and which times of day the entity is not active. The social media footprint 405 can reflect patterns of use of the entity, such as which days the entity more or less frequently uses a social media platform. Other patterns can be determined as well, such as patterns based on family or social events, work schedules, holidays, and so forth. These events can impact the entity's use of the social media platforms and can be used to detect or determine the entity's pattern of use. Optionally, an entity's calendar can be queried to determine a reason as to why the entity is engaging with a platform more or less than normal. Additionally, the embodiments can attempt to identify a reason as to why a pattern of behavior changes. For instance, perhaps an initial pattern indicates an entity engages with a platform on Monday afternoons at 2:00 pm. On a particular Monday, the entity did not engage until 3:00 μm. The embodiments are able to query the entity's calendar, email, or other tracking mechanisms in an attempt to identify why the deviation from the normal pattern occurred. In one case, it may be that the user had a doctor's appointment at 2:00 pm, and thus was delayed until 3:00 pm. Accordingly, some embodiments attempt to identify why a deviation from a known pattern of engagement occurs.

Usage data can be detected by monitoring an entity's "app" usage, by monitoring an entity's browsing history, by monitoring analytic data for a social media platform, and by any other process for determining engagement with a social media platform. The social media footprint 405 can not only reflect activity of use but it can also reflect the type of use an entity has with a social media platform. Indeed, the embodiments are able to analyze specific content an entity has posted or published (or even not published but kept private) on a social media platform. The content can be analyzed to determine the type of information the entity is revealing.

As an example, the type of content can be personal or private content or non-identifying content. Examples of personal information include an address, bank information, and so forth. Non-identifying content can include a "like" of a photo, a comment of a photo, and so on. Accordingly, any type of engagement an entity has with a social media platform can be analyzed and can be reflected via the social media footprint 405. Further details on this aspect will be provided later.

The risk factors 400 also include a history 410 of the entity. History 410 encompasses a broad array of aspects. In some cases, the history 410 includes a monitoring of the entity's browsing history to determine which types of websites the entity frequents. In some cases, the history 410 includes whether the entity has had past experiences with identity theft events, viruses, malware, and so forth. The history 410 can review or determine a pattern of behavior the entity has (in a general sense) with his/her interactions with the computer system.

In some cases, the history 410 can also indicate the entity's physical interactions with a computer device. For instance, the history 410 can reveal whether an entity often leaves his/her device in an unlocked state while not physically near that device. As an example, it may be the case that the entity leaves his/her computer unlocked at a workplace while using the restroom. The computer's camera can detect the absence of the entity and a timer can detect how long the entity is gone. Similarly, the history 410 can review whether the entity leaves his/her cell phone in an unguarded or unwatched and unlocked state. Computer security measures often instruct entities to lock their devices when they are not in use or when the entity is not physically near the device. Leaving a device unlocked and unattended can invite malicious entities to improperly use the device. As such, the history 410 can be used to monitor patterns of behavior an entity has with regard to locking and attending devices, as well as numerous other types of past historical trends and patterns.

The hardware configuration 415 refers to the hardware settings or configurations of a computing device. Such settings include, but are not limited to, the availability or accessibility of a network port, the ability to remotely control the device, the ability to remotely turn on or off the microphone, speaker, and camera. The settings also include whether peer hosting and content sharing is available. The settings also include the ability to operate as a hotspot. Indeed, any type of hardware setting can be monitored and can be reflected in the hardware configuration 415.

The software configuration 420 refers to software settings and/or applications installed on a device. For instance, the software configuration 420 can indicate whether anti-virus or anti-malware software is installed. It can also indicate how frequently scans of the device are performed, the presence of existing suspicious software, and so on.

The credential behavior 425 reflects whether or not an entity follows specific patterns in selecting usernames and/or passwords. For example, the credential behavior 425 can indicate whether the entity uses the same username (or a slight variant) across multiple different platforms, such as a financial institution, a social media account, or any other login account. If the entity uses the same username across multiple different platforms, then it may also be the case that the entity uses the same password for those accounts. If a malicious entity can figure out the username/password combination for one account, then there is a chance the malicious entity can use that same combination to access other accounts of the entity as well. As such, the credential behavior 425 can monitor username/password combinations used by the entity to determine whether the user's behavior leads to more risk.

FIG. 5 lists a few more specific risk factors 500 that were briefly mentioned earlier. Specifically, the risk factors 500 include access to a computer port 505, the presence or absence of anti-virus 510 software, whether the entity has been involved in previous breaches 515 (e.g., security breaches), and the monitoring of browsing history 520. The ellipsis 525 indicates that any other risk factor can be monitored and can be analyzed.

As further examples of risk factors, the embodiments can monitor personal behavior, digital risks, corporate behavior, and finance and identity attributes. In some cases, these factors can be weighted so that they may be considered more or less heavily than other factors. To illustrate, it may be the case that the personal behaviors have a weight of 50%, the digital risk has a weight of 20%, the corporate behavior has a weight of 20%, and the finance and identity has a weight of 10%. Of course, other weights can be used.

Examples of personal behavior include, but certainly are not limited to, security hygiene, types of products consumed, credit freeze status, and even data privacy. Security hygiene can include factors such as exposed passwords, reused passwords, weak passwords, inactive two factor authentication, phishing vulnerability, traffic to known malicious sites, malware alerts on owned devices, the number of active vulnerabilities by severity and age, and even device encryption.

Products consumed can include factors such as credit monitoring, ID monitoring, anti-virus, malware, or ransomware, safe browsing extensions, password managers, digital inheritance plan, monitoring and managing wallets, finance management, or endpoint control. The management and/or tracking of these attributes can be included in the "product consumed" category.

Credit freeze status can include factors such as whether a user's Transunion report is frozen, Experian report is frozen, or the Equifax report is frozen. Other information might also be frozen, and the status can include or indicate that information's state as well.

Data privacy can include factors such as information requested from corporation, delete requests from corporation, or even corporations having privacy policies.

Examples of digital risk can include online exposure, medical exposure, insurance exposure, increases in any other type of exposure, and/or other breaches. Online exposure can include the number of social media accounts a user has, social media threats, open web threats, and dark web threats. Medical exposure can include the number of medical institutions associated with a user, employment exposures, and the number of former employers of a user. Insurance exposure can include the number of insurance accounts a user has. Breaches can include a user's email being involved in any type of breach, corporations having data breaches, or dark web fingerprint alerts, such as breaches involves social security numbers, bank account numbers, passport numbers, driver's license numbers, credit card numbers, debit card numbers, telephone numbers, home addresses, emails, and full name.

Examples of corporate behavior can include information related to technology, policies and oversight, breaches, benchmarks, customer outreach, and information exchanges. Risks associated with technology can include software patching, web encryption, email security, and domain security. Risks associated with policies and oversight can include customer pressure, regulatory scrutiny, security and compliance evidence, and security personnel. Risks associated with breaches can include security events, leaked credentials, complexity, attach surfaces, DNS hosting, and domain registrar fragmentation. Risks associated with benchmarks can include similar company comparisons. Risks associated with customer outreach can include privacy requests for pages or emails, privacy policy pages, bug bounty programs, and reports on security incidents or emails. Risks associated with information exchanges can include company communications that control adoption.

Examples of finance and identity can include fraudulent finances, credit report, criminal monitoring, Experian AO score, and Experian IEN score. For instance, risks associated with fraudulent finances can include new deposit account applications, new deposit account openings, changes made to deposit account holder's personal information, new signers added to depositor's account, new credit card account applications, or new credit card account openings. Risks associated with credit report events include the number of tradelines and the number of companies identified on credit report. Risks associated with criminal monitoring include the number of criminal database discoveries. Risks associated with Experian's Account Opening (AO) score include passive authentication. Risks associated with Experian's Identity Element Network (IEN) Score also include risks of passive authentication. Accordingly, risks can be identified for any of the above topics or aspects.

Returning to FIG. 3, the analysis engine 310 is able to receive, as input, the risk factors 305, which include the risk factors 400 of FIG. 4 and the risk factors 500 of FIG. 5. In addition to or as an alternative to receiving the risk factors 305 as input, the analysis engine 310 itself can also collect the information regarding the risk factors 305. That is, the analysis engine 310 can query platforms or otherwise determine the risk factors 305. In any event, the analysis engine 310 analyzes each of the various factors to determine areas where the entity's behavior leads toward increased risk of identity theft.

In some cases, the analysis can be ongoing, as shown by real-time monitoring 315. That is, instead of a periodic or scheduled data collection and analysis operation, some embodiments continuously or near continuously (e.g., a shortened period or frequency, such as a new consideration every certain number of seconds or minutes) collect and monitor the risk factors 305 to determine risk.

In some cases, the analysis engine 310 is or includes a machine learning algorithm or artificial intelligence. As used herein, reference to "machine learning" (ML) or to a ML model or to a "neural network" or to artificial intelligence may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some cases, the analysis engine 310 relies on a specific algorithm to weight and consider the various risk factors 305. For instance, personal behavior risks can be weighted relatively heavily, such as perhaps at a rate of 50%. Digital risks can be weighted at 20%. Corporate behavior can be weighted at 20%. Finance and identity can be weighted at 10%.

As a result of analyzing the various risk factors 305, the analysis engine 310 is able to generate a risk assessment 320, which can include a risk score 320A. That is, the analysis engine 310 can rely on a risk algorithm that weights, considers, and potentially even prioritizes different risk factors in order to determine the user's risk of having his/her identity stolen.

The risk assessment 320 identifies areas where the entity is potentially subject to increased risk of identity theft. The risk score 320A can provide a summary view or description regarding the user's potential risk for identity theft, similar to how a credit score provides a summary description of a person's creditworthiness. For instance, if the analysis engine 310 identified that the entity uses the same username/password combination for multiple platforms, then the risk assessment 320 can alert the entity that he/she should change the usernames and passwords. If the analysis engine 310 identified that the entity has published personal information to a social media platform, then the risk assessment 320 can reflect such. Higher risk scores reflect a higher likelihood of identity theft while lower scores reflect a lower likelihood. Of course, the contrary may be used as well, where a lower score reflects a higher likelihood and a higher score reflects a lower likelihood.

The architecture 300 also includes the ability to perform or institute mitigation 325 in response to a detected risk that meets or exceeds a risk threshold. For example, the mitigation 325 can include issuing any number of alerts to an entity to inform the entity of the detected risk. The mitigation 325 can also include automatic operations, such as temporarily preventing access to a computer port or preventing an application from executing. The mitigation 325 can also include automatically downloading new drivers, updates, or other information in order to resolve identified issues.

The mitigation 325 can also include automatically scrubbing metadata from content an entity publishes to a social media account. For example, prior to an entity publishing a picture or video to a social media account, the mitigation 325 can involve scrubbing a geotag or other metadata from the image or video prior to publication. In some cases, the mitigation 325 can also involve pixelating or blurring an image to hide certain content, such as perhaps a child's face or some other person's face. Blurring can be performed on other areas of an image as well, such as identification of a street name, landmark feature, and so on. In some cases, object segmentation is performed on an image prior to publication, and the object segmentation can classify objects as being potentially personally identifiable information. If an object is considered to be personally identifiable information, then the embodiments can be triggered to either automatically blur or pixelate the object or issue a request confirming that blurring can occur.

The mitigation 325 can also be triggered when suspicious activity is detected, such as when an account is logged in from a suspicious geographic location. As an example, suppose the analysis engine 310 determines the entity is currently located in the United States but also detects a log in to an entity's account from a foreign location. The mitigation 325 can be triggered to block the login at the foreign location from happening and can also issue an alert to the entity regarding the potential security breach. Accordingly, the architecture 300 can be used to monitor and mitigate potential threats to an entity's identify. Further details on mitigation will be provided later.

Figure 6:
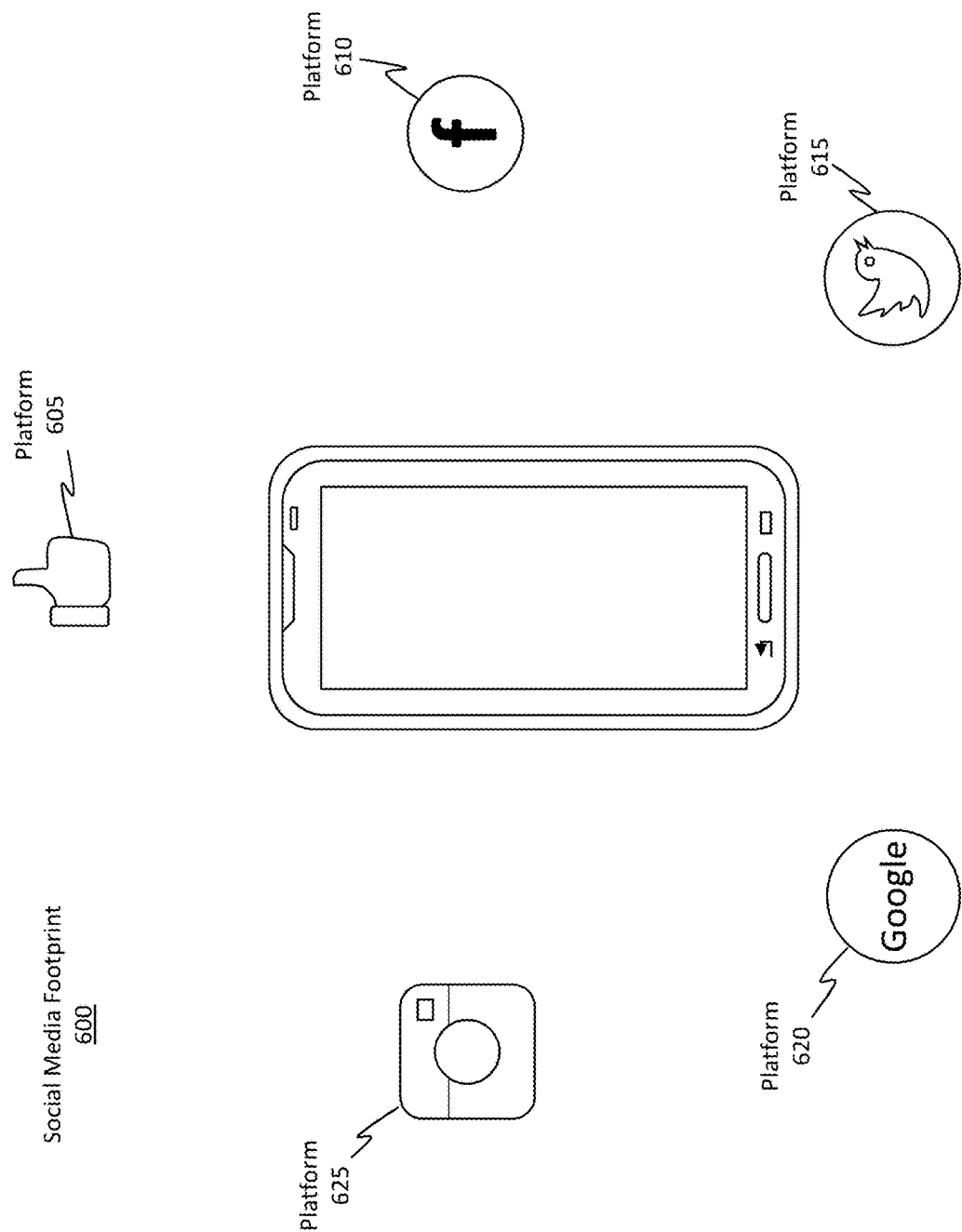
FIG. 6 illustrates a social media footprint.

FIG. 6 provides some additional details regarding the social media footprint 600, which is representative of the social media footprint 405 of FIG. 4. As shown, the social media footprint 600 reflects engagements an entity has with any number of social media platforms, such as platforms 605, 610, 615, 620, and 625. While only five platforms are illustrated in FIG. 6, one will appreciate how any number of platforms can be monitored for entity engagement.

The embodiments are able to monitor an entity's behavior in engaging with a single platform or, alternatively, with a combination of multiple platforms. Different patterns of behavior can emerge or can be detected based on whether the entity is interacting with a single platform or with multiple different platforms. Accordingly, any type of engagement with a platform (e.g., publication of images, videos, text, audio, responses to comments or statements, likes, dislikes, etc.) can be analyzed to determine whether the entity is revealing personal information, which may lead to an increased risk of identity theft.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
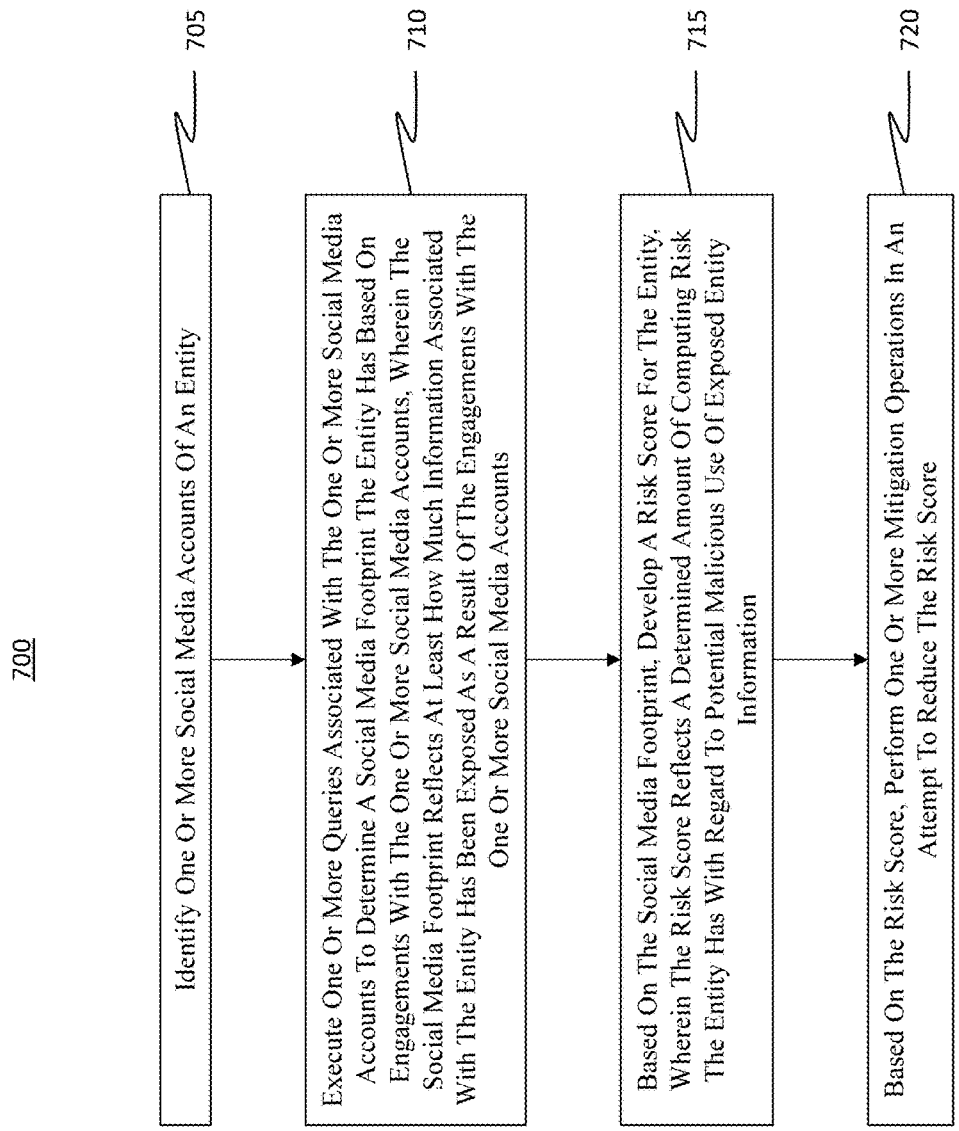
FIG. 7 illustrates a flowchart of an example method for assessing computing risk.

Attention will now be directed to FIG. 7, which illustrates a flowchart of an example method 700 for assessing a computing risk of an entity based at least on a social media footprint of that entity. The method 700 may be performed by any type of computing device, such as a cloud server or even a client computing device. Similarly, the method 700 may be used to detect risk for any one or combination of multiple devices and/or accounts the entity has.

Initially, method 700 includes an act (act 705) of identifying one or more social media accounts of an entity. For example, an entity can have an account with any of the platforms 605-625 shown in FIG. 6. The process of identifying social media accounts can include analyzing which applications are currently installed on a user device as well as analyzing whether those applications are accessed or whether they are kept in sleep mode. Another technique for identifying social media accounts includes querying an entity's browsing history to identify which social media platforms a user or entity has. Another technique for identifying social media accounts includes querying a password keeper or a tracking database or repository to see which accounts an entity has. The embodiments are able to maintain a listing or database of social media accounts used by the entity.

It may be the case that an entity accesses different social media accounts on different computing devices. By way of example, an entity (e.g., a user) may always access INSTAGRAM™ from the user's mobile phone and may always access FACEBOOK™ from the user's laptop. The embodiments are able to identify user accounts or profiles across any number of user devices. Once the devices are identified, the embodiments are able to identify which social media accounts the users engages with on those devices. Accordingly, a database or a listing of social media accounts can be generated based on social media accounts an entity has across any number of devices. If the entity is a large scale entity comprising multiple different users, such as perhaps an enterprise, the database can include an aggregate listing of social media accounts for the enterprise as a whole and can also include individualized listings of social media accounts for individual users in the enterprise.

Act 710 then involves executing one or more queries associated with the one or more social media accounts. These queries are executed in order to determine a social media footprint the entity has based on engagements with the social media accounts. The social media footprint reflects at least how much information (e.g., information that is associated with the entity) has been exposed as a result of the engagements with the social media accounts.

Regarding the queries, any type of query can be executed. In some instances, an Internet crawl can be performed to search for one or more key words associated with the entity, such as perhaps a search for the entity's username or other information. In some instances, the query can include generating a set of search parameters and then entering those search parameters into a search engine (e.g., Google™) to search. In some cases, the search involves generating search parameters and then entering those parameters as search terms into each of the social media platforms themselves. Accordingly, any number and any type of query can be executed.

The social media footprint can reflect the number, type, and even specific nature or content of images, actions (e.g., likes or dislikes), audio, videos, and any other type of content the entity has posted. The footprint can also reflect whether the content has metadata, geotags, or any other associated information. The footprint can also reflect text, audio, or any other media format the entity has posted. The footprint can reflect the specific type of content as well, such as whether the content reflects personal information (e.g., name, address, account information, and so on) or is non-identifying (e.g., a like or dislike).

Figure 8:
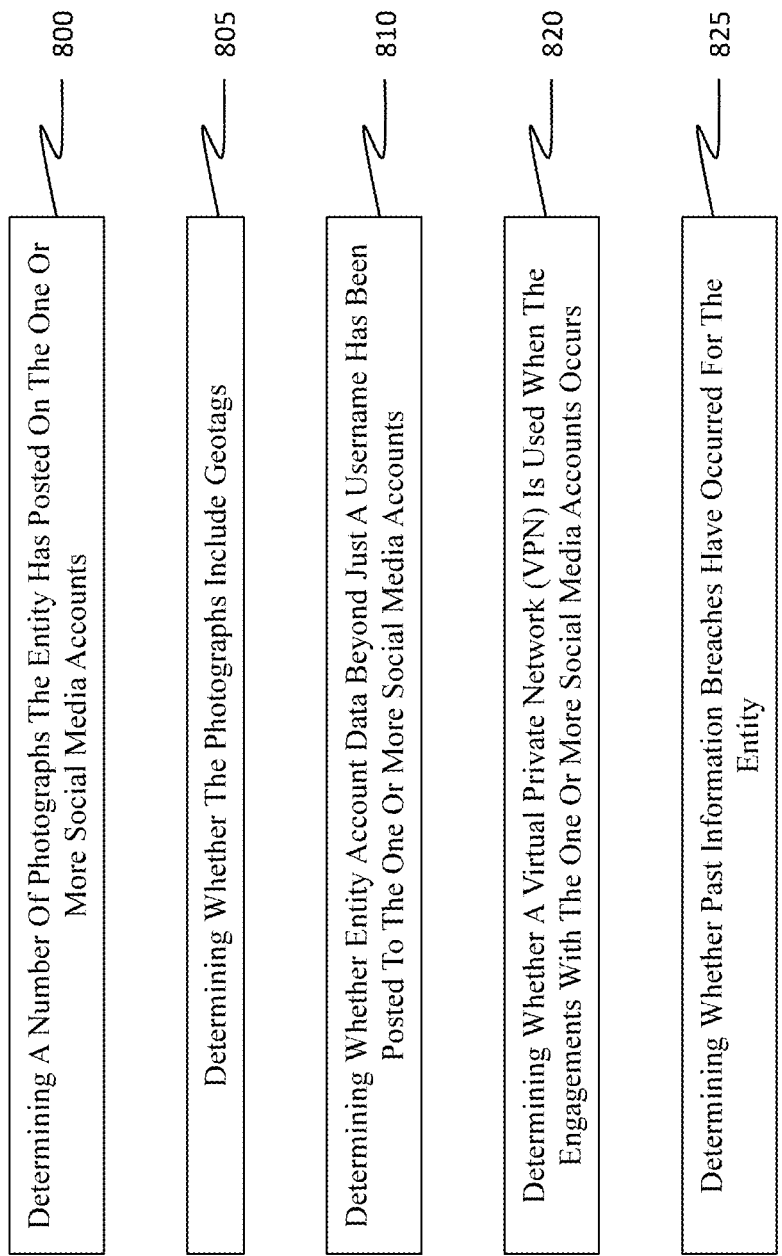
FIG. 8 illustrates various factors that can be analyzed to determine risk.

Turning briefly to FIG. 8, this Figure illustrates various examples of what the social media footprint can describe or reflect as a result of performing the queries. That is, executing the queries associated with the social media accounts to determine the social media footprint can include determining (act 800) a number of photographs or videos the entity has posted on the social media accounts. The process can also include determining (act 805) whether the photographs or videos include geotags. An analysis on the photographs or videos can also be performed to determine whether the content of the photograph or video reveals personal information, such as an indication of a home or residence. Object segmentation and ML can be executed against the image and/or video to identify objects and determine whether those objects reflect personal information (e.g., the name of the street on which an entity resides).

The process can further include determining (act 810) whether entity/user account data beyond just a username has been posted to the social media accounts. Examples of data that is "beyond" just a username include personal information such as a user's age, name, weight, height, gender, race, driver's license information, address, any type of account information, and so on. Machine learning can be employed to help differentiate personal information from non-personal information.

A determination (act 820) can also be made as to whether a virtual private network (VPN) has been used or is currently being used when the entity's engagements with the social media accounts occur. A VPN beneficially blocks or hides information from other entities (even Internet providers) that may otherwise be trying to spy, track, or monitor on an entity. The detection of a VPN can help lower the risk score mentioned earlier because data is more secure when a VPN is used, especially when accessing financial accounts or when logging on to any type of account. Indeed, when a device is connected to a public wireless network (e.g., such as in a hotel, airport, or coffee shop), other devices connected to that same public wireless network can potentially "see" the information that is transmitted from and received by the device. Use of the VPN effectively masks or hides this information, even when connected to a public wireless network. Therefore, the embodiments are able to determine an entity's proclivity for using a VPN and can raise or lower the risk score based on that pattern of use.

A determination (act 825) can also be made as to whether past information breaches have occurred for the user. Such breaches can occur as a result of the user's own doing and/or as a result of a third party breach, such as when a company's information is hacked and client information is released. Such information can also involve breaches or disclosures of the user's credit history as well. The embodiments are also able to determine whether the entity has any kind of identity theft protection service. If so, then the risk score can be lowered.

Returning to FIG. 7, based on the social media footprint, act 715 involves developing a risk score for the user. The risk score reflects a determined amount of computing risk the entity has with regard to potential malicious use of exposed entity information. For example, the analysis engine 310 can be used to generate the risk score and can include the risk score in the risk assessment. In some cases, the risk score is updated based on a real-time or near real-time monitoring of the user's engagements with the social media accounts and/or with other interactions with a computer system.

Optionally, the risk score is further determined based on at least one additional criterion comprising (i) properties of a computer port of a device used by the user (e.g., is that port hackable or otherwise accessible); (ii) presence or absence of an anti-virus software on the device used by the user; (iii) history of previous information breaches that have happened to the user; (iv) browsing history behavior of the user; and/or (v) credential behavior of the user.

Figure 9:
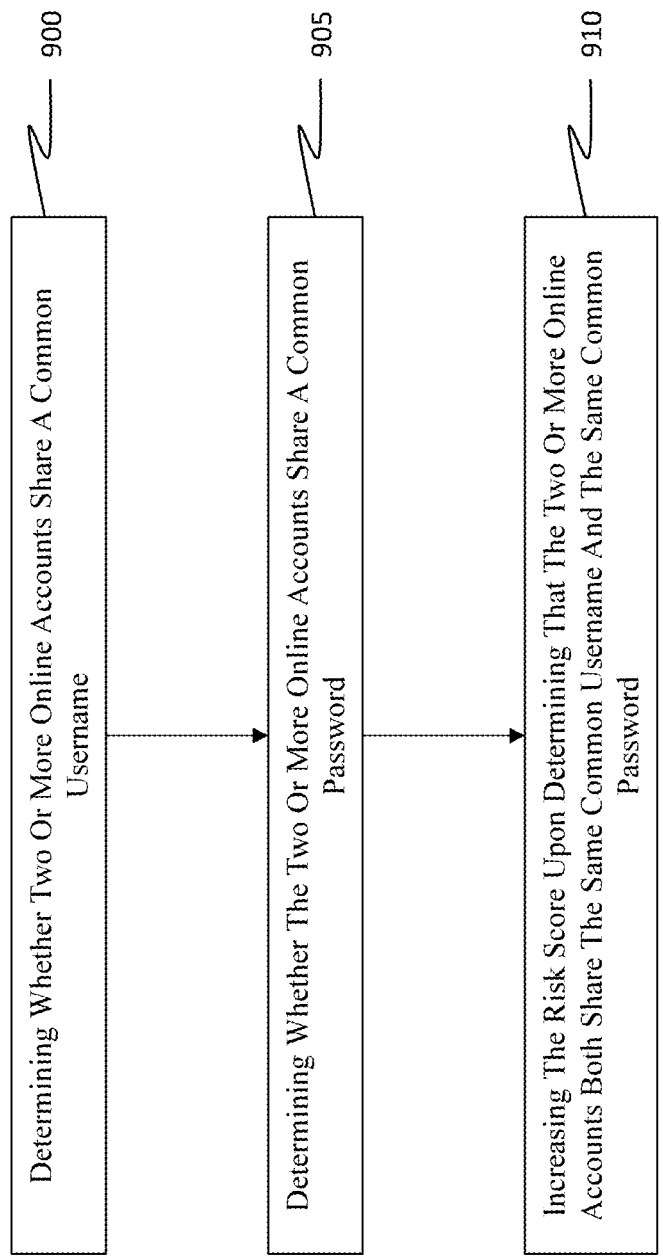
FIG. 9 illustrates an example technique for monitoring an entity's credential behavior.

When the credential patterns of the entity are used to determine the risk score, the processes outline in FIG. 9 can be followed. For example, act 900 involves determining whether two or more online accounts share a common username. This operation can be performed by querying a password keeper, by querying a web browser that tracks usernames, by querying the entity itself to learn usernames, and/or by even querying multiple websites to see if that username exists (even if a login does not occur).

Act 905 includes determining whether the two or more online accounts share a common password. As an example, the embodiments can automatically enter the same username and password into multiple different accounts and gauge whether the login is successful. In some instances, an entity's password keeper can be accessed and reviewed to determine whether multiple accounts use the same username, password, or username and password combination.

Act 910 then involves increasing the risk score upon determining that the two or more online accounts both share the same common username and the same common password.

Increasing the risk score operates to heighten the level of risk, or rather to reflect a heightened level of risk, on the part of the user because if the username/password combination were to be hacked, then the malicious entity could potentially access multiple accounts.

Figure 10:
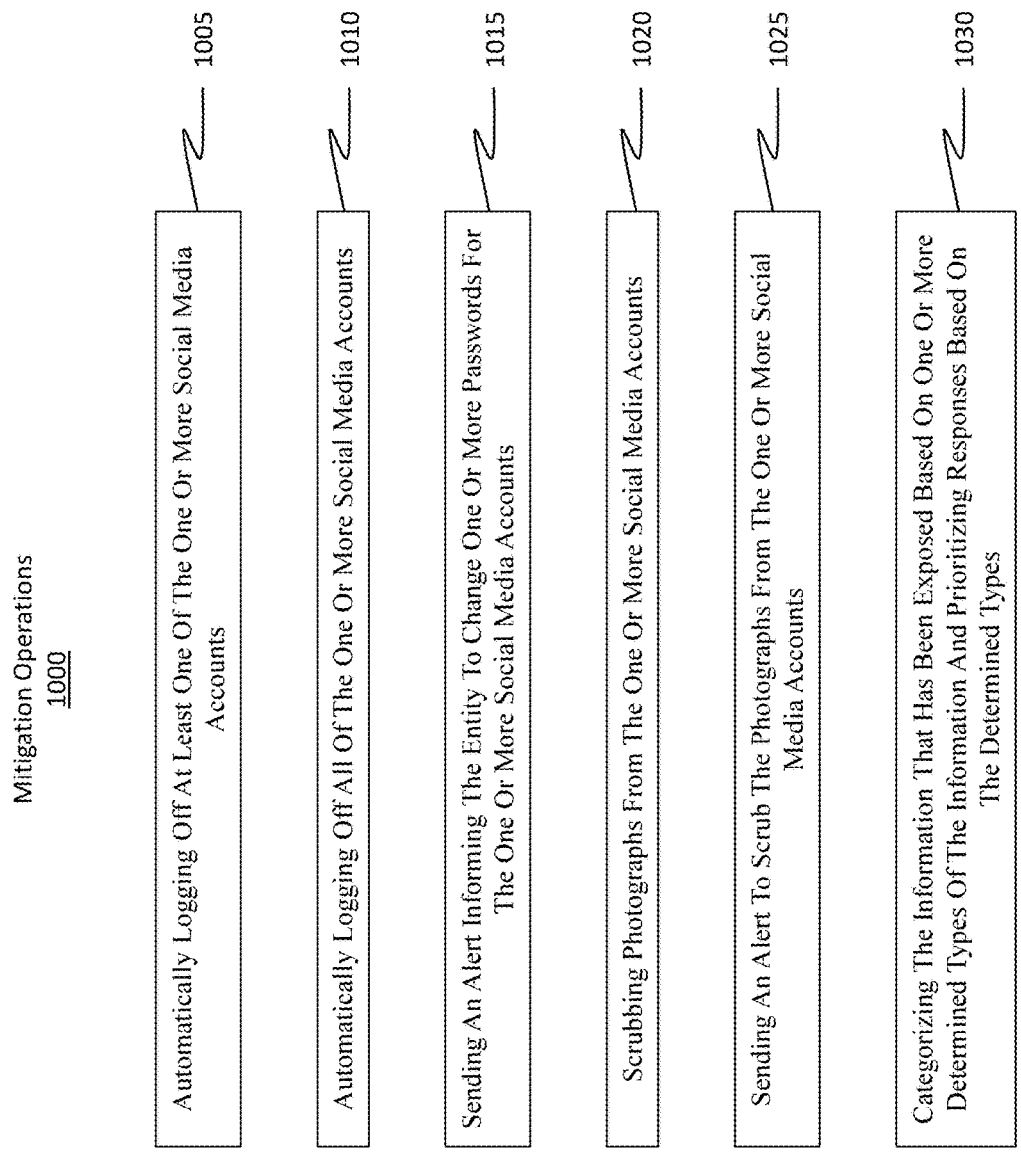
FIG. 10 illustrates various mitigation operations that can be performed in an attempt to reduce computing risk.

Returning to FIG. 7, based on the risk score, act 720 includes performing one or more mitigation operations in an attempt to reduce the risk score. FIG. 10 lists a number of optional mitigation operations 1000 that can be performed. Any one or combination of multiple mitigation operations can be performed.

The one or more mitigation operations, which are performed in the attempt to reduce the risk score, can include automatically logging off at least one of the one or more social media accounts, as shown by act 1005. The operations can also include automatically logging off all of the social media accounts, as shown by act 1010.

The operations can include sending (act 1015) an alert informing the entity to change one or more passwords for the social media accounts. The operations can include scrubbing (act 1020), deleting, blurring, or otherwise obfuscating photographs, videos, audio, text, or any other content from the social media accounts. It can also include scrubbing metadata from the content while allowing other content (e.g., image content) to remain. In other words, the image can continue to be posted, but the image's metadata can be scrubbed.

The operations can include sending (act 1025) an alert (e.g., to the entity) to scrub the photographs from the one or more social media accounts (as opposed to automatically scrubbing the data). Additionally, the operations can include categorizing (act 1030) the information that has been exposed based on one or more determined types of the information and prioritizing responses based on the determined types. For instance, residence location information may be determined to have a high priority while a birth date may be determined to have a lower priority. Content deemed to be higher in priority can be addressed prior to content deemed to be lower in priority. In some cases, the higher priority content can be automatically dealt with (e.g., automatically deleted, scrubbed, blurred, etc.) while the lower priority content can be delayed and an alert can be sent to the entity requesting instructions on how to deal with the lower priority content.

Accordingly, the disclosed embodiments bring about numerous and substantial improvement to the field of identity theft protection. By following the disclosed principles, entities are provided with a heightened level of protection and information. In particular, the embodiments are able to analyze the footprint an entity has with any number of social media accounts. Based on that footprint, the embodiments can then generate an assessment indicating the level of risk the entity has with regard to potential identity theft. The embodiments also beneficially provide practical applications and improvements to the field through the use of different mitigation operations, which are designed to help lower the risk.

Example Computer/Computer Systems

Figure 11:
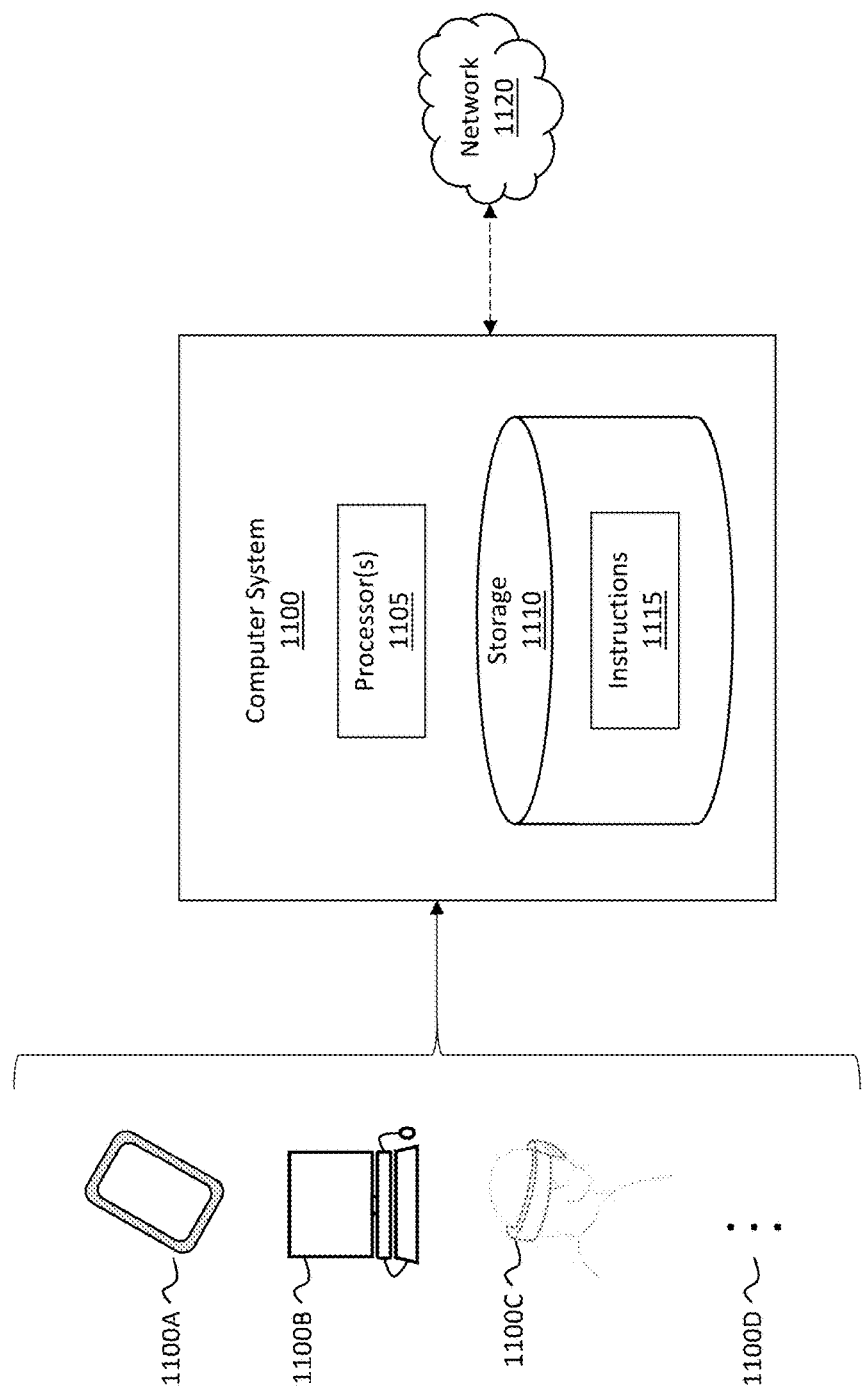
FIG. 11 illustrates an example computer system configured to perform any of the disclosed operations.

Attention will now be directed to FIG. 11 which illustrates an example computer system 1100 that may include and/or be used to perform any of the operations described herein. Computer system 1100 may take various different forms. For example, computer system 1100 may be embodied as a tablet 1100A, a desktop or a laptop 1100B, a mobile or wearable device 1100C, or a standalone device. The ellipsis 1100D illustrates how different form factors can be used. Computer system 1100 may also be a distributed system that includes one or more connected computing components/devices that are in communication with computer system 1100.

In its most basic configuration, computer system 1100 includes various different components. FIG. 11 shows that computer system 1100 includes one or more processor(s) 1105 (aka a "hardware processing unit") and storage 1110.

Regarding the processor(s) 1105, it will be appreciated that the functionality described herein can be performed, at least in part, by one or more hardware logic components (e.g., the processor(s) 1105). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "analysis engine," or "engine" can refer to hardware processing units or to software objects, routines, or methods that may be executed on computer system 1100. The different components, modules, engines, and services described herein may be implemented as objects or processors that execute on computer system 1100 (e.g. as separate threads).

Storage 1110 may be physical system memory, which may be volatile, non-volatile, or some combination of the two. The term "memory" may also be used herein to refer to non-volatile mass storage such as physical storage media. If computer system 1100 is distributed, the processing, memory, and/or storage capability may be distributed as well.

Storage 1110 is shown as including executable instructions 1115. The executable instructions 1115 represent instructions that are executable by the processor(s) 1105 of computer system 1100 to perform the disclosed operations, such as those described in the various methods.

The disclosed embodiments may comprise or utilize a special-purpose or general-purpose computer including computer hardware, such as, for example, one or more processors (such as processor(s) 1105) and system memory (such as storage 1110), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1100 may also be connected (via a wired or wireless connection) to external sensors (e.g., one or more remote cameras) or devices via a network 1120. For example, computer system 1100 can communicate with any number devices or cloud services to obtain or process data. In some cases, network 1120 may itself be a cloud network. Furthermore, computer system 1100 may also be connected through one or more wired or wireless networks 1120 to remote/separate computer systems(s) that are configured to perform any of the processing described with regard to computer system 1100.

A "network," like network 1120, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1100 will include one or more communication channels that are used to communicate with the network 1120. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to assess a computing risk of an entity based at least on a social media footprint of the entity, said computer system comprising:
one or more processors; and
one or more computer-readable hardware storage devices that store instructions that are executable by the one or more processors to cause the computer system to at least:
identify one or more social media accounts of the entity;
execute one or more queries associated with the one or more social media accounts to determine a social media footprint of the entity based on engagements with the one or more social media accounts, wherein the social media footprint reflects at least how much information associated with the entity has been exposed as a result of the engagements with the one or more social media accounts;
based on the social media footprint, develop and update a risk score for the entity, wherein the risk score reflects a determined amount of a computing risk that the entity has with regard to potential malicious use of exposed information associated with the entity; and
based on the risk score, perform one or more mitigation operations in an attempt to reduce the risk score, wherein the one or more mitigation operations include:
automatically logging off all of the one or more social media accounts, wherein the one or more social media accounts are additionally usable to perform one or more additional actions; and
automatically removing metadata from content of the entity before the content is published to the one or more social media accounts.

2. The computer system of claim 1, wherein executing the one or more queries associated with the one or more social media accounts to determine the social media footprint includes at least one of:
determining a number of photographs the entity has posted on the one or more social media accounts;
determining whether the photographs include geotags;
determining whether entity account data beyond just a username has been posted to the one or more social media accounts;
determining whether a virtual private network (VPN) is used when the engagements with the one or more social media accounts occurs; or
determining whether past information breaches have occurred for the entity.

3. The computer system of claim 1, wherein the risk score is further determined based on at least one additional criterion, said criterion being one of:
properties of a computer port of a device used by the entity;
presence or absence of an anti-virus software on the device used by the entity;
history of previous information breaches that have happened to the entity;
browsing history behavior of the entity; and
credential patterns of the entity.

4. The computer system of claim 3, wherein the criterion is the credential patterns of the entity, and determining the risk score based on the credential patterns includes:
determining whether two or more online accounts share a common username;
determining whether the two or more online accounts share a common password; and
increasing the risk score upon determining that the two or more online accounts both share the common username and the common password.

5. The computer system of claim 1, wherein determining the risk score is further based on at least one of:
a browsing history of the entity;
a history of previous information breaches associated with the entity;
a hardware configuration of a device used by the entity;
a software configuration of the device used by the entity; or
a credential behavior used by the entity.

6. The computer system of claim 1, wherein the risk score is updated based on a real-time monitoring of the engagements with the one or more social media accounts.

7. The computer system of claim 1, wherein the one or more mitigation operations, which are performed in the attempt to reduce the risk score, include:
    sending an alert informing the entity to change one or more passwords for the one or more social media accounts;
    scrubbing photographs from the one or more social media accounts;
    sending an alert to scrub the photographs from the one or more social media accounts; and
    categorizing information that has been exposed based on one or more determined types and prioritizing responses based on the determined types.

8. A method for assessing a computing risk of an entity based at least on a social media footprint of the entity, said method comprising:
    identifying one or more social media accounts of an entity;
    executing one or more queries associated with the one or more social media accounts to determine a social media footprint of the entity based on engagements with the one or more social media accounts, wherein the social media footprint reflects at least how much information associated with the entity has been exposed as a result of the engagements with the one or more social media accounts;
    based on the social media footprint, developing a risk score for the entity, wherein the risk score reflects a determined amount of a computing risk that the entity has with regard to potential malicious use of exposed entity information; and
    based on the risk score, performing one or more mitigation operations in an attempt to reduce the risk score, wherein the one or more mitigation operations include:
    automatically logging off all of the one or more social media accounts, wherein the one or more social media accounts are additionally usable to perform one or more additional actions; and
    automatically scrubbing metadata from content of the entity before the content is published to the one or more social media accounts.

9. The method of claim 8, wherein executing the one or more queries associated with the one or more social media accounts to determine the social media footprint includes at least one of:
    determining a number of photographs the entity has posted on the one or more social media accounts;
    determining whether the photographs include geotags;
    determining whether entity account data beyond just a username has been posted to the one or more social media accounts;
    determining whether a virtual private network (VPN) is used when the engagements with the one or more social media accounts occurs; or
    determining whether past information breaches have occurred for the entity.

10. The method of claim 8, wherein the risk score is further determined based on at least one additional criterion, said criterion being one of:
    properties of a computer port of a device used by the entity;
    presence or absence of an anti-virus software on the device used by the entity;
    history of previous information breaches that have happened to the entity;
    browsing history behavior of the entity; and
    credential patterns of the entity.

11. The method of claim 10, wherein the criterion is the credential patterns of the entity, and determining the risk score based on the credential patterns includes:
    determining whether two or more online accounts share a common username;
    determining whether the two or more online accounts share a common password; and
    increasing the risk score upon determining that the two or more online accounts both share the common username and the common password.

12. The method of claim 8, wherein determining the risk score is further based on at least one of:
    a browsing history of the entity;
    a history of previous information breaches associated with the entity;
    a hardware configuration of a device used by the entity;
    a software configuration of the device used by the entity; or
    a credential behavior used by the entity.

13. The method of claim 8, wherein the risk score is updated based on a real-time monitoring of the engagements with the one or more social media accounts.

14. The method of claim 8, wherein the one or more mitigation operations, which are performed in the attempt to reduce the risk score, include:
    sending an alert informing the entity to change one or more passwords for the one or more social media accounts;
    scrubbing photographs from the one or more social media accounts;
    sending an alert to scrub the photographs from the one or more social media accounts; and
    categorizing information that has been exposed based on one or more determined types and prioritizing responses based on the determined types.

15. The method of claim 8, wherein the social media footprint includes a frequency by which the entity posts or publishes content on one or more social media platforms.

16. One or more hardware storage devices that store instructions that are executable by one or more processors of a computer system to cause the computer system to assess a computing risk of an entity based at least on a social media footprint of that entity by causing the computer system to at least:
    identify one or more social media accounts of the entity;
    execute one or more queries associated with the one or more social media accounts to determine a social media footprint of the entity based on engagements with the one or more social media accounts, wherein the social media footprint reflects at least how much information associated with the entity has been exposed as a result of the engagements with the one or more social media accounts;
    based on the social media footprint, develop a risk score for the entity, wherein the risk score reflects a determined amount of a computing risk that the entity has with regard to potential malicious use of exposed entity information; and
    based on the risk score, perform one or more mitigation operations in an attempt to reduce the risk score, wherein the one or more mitigation operations include:

automatically logging off all of the one or more social media accounts, wherein the one or more social media accounts are additionally usable to perform one or more additional actions; and automatically removing metadata from content of the entity prior to publishing to the one or more social media accounts.

17. The one or more hardware storage devices of claim 16, wherein executing the one or more queries associated with the one or more social media accounts to determine the social media footprint includes at least one of:

determining a number of photographs the entity has posted on the one or more social media accounts;

determining whether the photographs include geotags;

determining whether entity account data beyond just a username has been posted to the one or more social media accounts;

determining whether a virtual private network (VPN) is used when the engagements with the one or more social media accounts occurs; or determining whether past information breaches have occurred for the entity.

18. The one or more hardware storage devices of claim 16, wherein the risk score is further determined based on at least one additional criterion, said criterion being one of:

properties of a computer port of a device used by the entity;

presence or absence of an anti-virus software on the device used by the entity;

history of previous information breaches that have happened to the entity;

browsing history behavior of the entity; and credential patterns of the entity.

19. The one or more hardware storage devices of claim 16, wherein the criterion is the credential patterns of the entity, and determining the risk score based on the credential patterns includes:

determining whether two or more online accounts share a common username;

determining whether the two or more online accounts share a common password; and increasing the risk score upon determining that the two or more online accounts both share the common username and the common password.

20. The one or more hardware storage devices of claim 16, wherein determining the risk score is further based on at least one of:

a browsing history of the entity;

a history of previous information breaches associated with the entity;

a hardware configuration of a device used by the entity;

a software configuration of the device used by the entity; or a credential behavior used by the entity.

* * * * *